United States Patent
Barnes

(10) Patent No.: US 6,348,172 B1
(45) Date of Patent: Feb. 19, 2002

(54) METHOD OF MAKING A HIDDEN TEAR SEAM IN A VEHICLE BODY PANEL

(75) Inventor: William Joseph Barnes, Waterford, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/383,431

(22) Filed: Aug. 27, 1999

(51) Int. Cl.⁷ .............................................. B29C 41/08
(52) U.S. Cl. ...................................... 264/309; 264/299
(58) Field of Search ................................. 264/309, 299

(56) References Cited

U.S. PATENT DOCUMENTS

| | | | | |
|---|---|---|---|---|
| 3,709,285 A | * | 1/1973 | Ruckstuhl .................... | 164/484 |
| 4,773,844 A | * | 9/1988 | Bartels et al. .............. | 264/310 |
| 4,822,549 A | * | 4/1989 | Verwilst et al. ............. | 264/309 |
| 5,013,508 A | * | 5/1991 | Troester ..................... | 264/309 |
| 5,210,127 A | * | 5/1993 | Werner et al. .............. | 524/889 |
| 5,466,412 A | * | 11/1995 | Parker et al. ............... | 264/309 |
| 5,804,121 A | * | 9/1998 | Gallagher ................... | 264/250 |
| 6,071,619 A | * | 6/2000 | De Winter .................. | 264/309 |

* cited by examiner

Primary Examiner—Allan R. Kuhns
(74) Attorney, Agent, or Firm—Charles E. Leahy

(57) ABSTRACT

A method of making a thermoplastic skin comprises the steps of providing a mold having a mold surface with first and second mold surface portions which intersect at a sharp corner coincident with the desired location of the tear seam in the molded skin. The mold is oriented with one of the first and second mold surface portions oriented in a generally horizontally orientation and the other of the mold surface portions oriented in a generally vertical orientation. A thermoplastic material such as polyurethane is sprayed onto the mold surface and the curing of the sprayed material is controlled to permit gravity to induce flow of the sprayed material down the vertical surface of the mold at the sharp corner and thereby provide a cured skin which is of significantly lessened thickness at the corner than at other regions of the skin. Accordingly, the reduced thickness of thermoplastic material at the sharp corner defines the tear seam at which the skin material will tear upon deployment of an air bag against the skin.

4 Claims, 5 Drawing Sheets

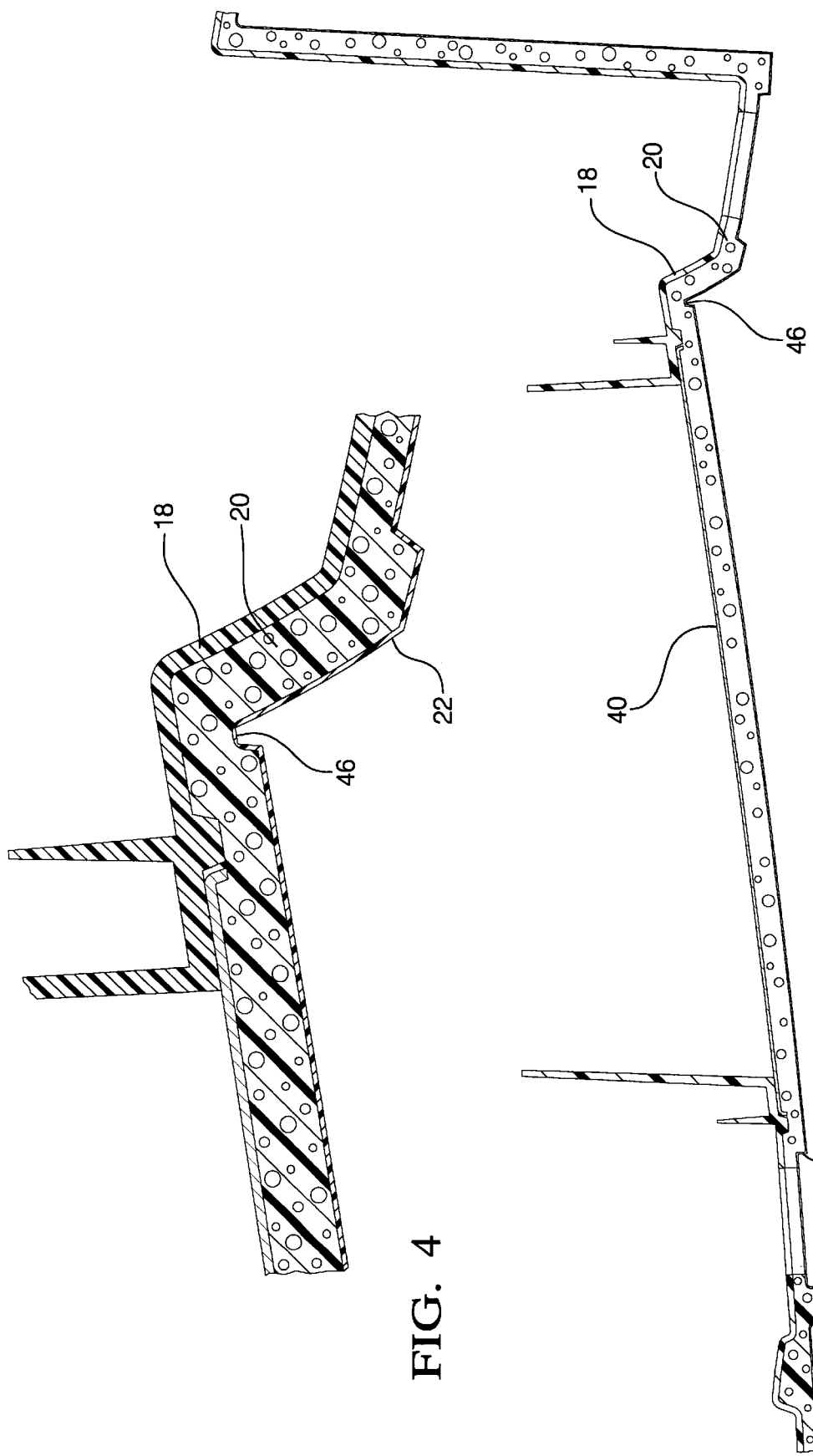

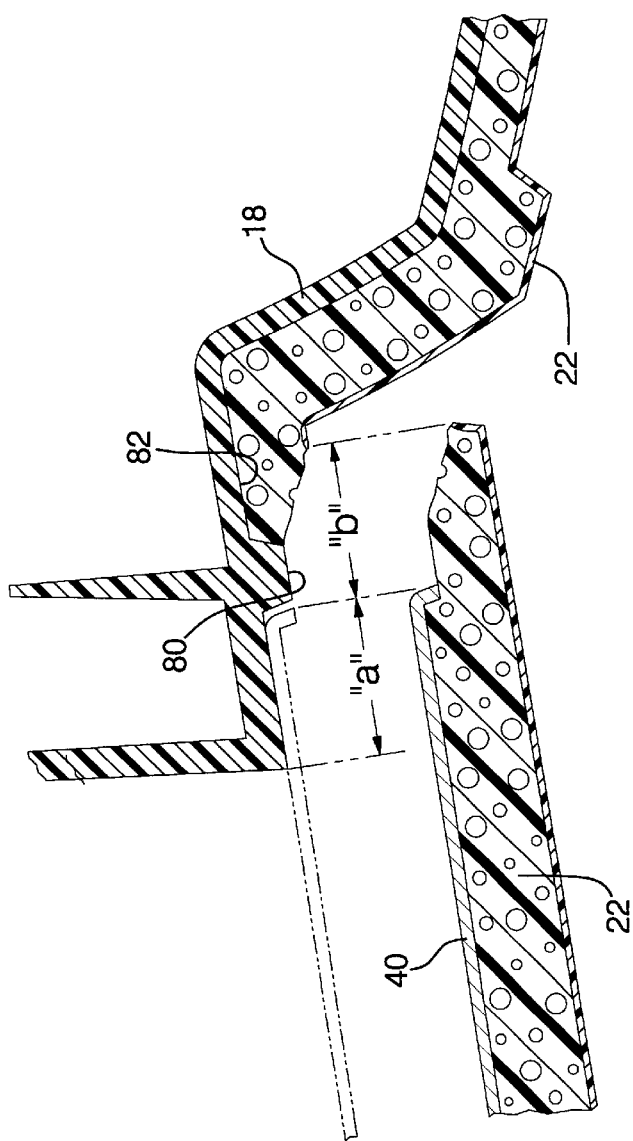
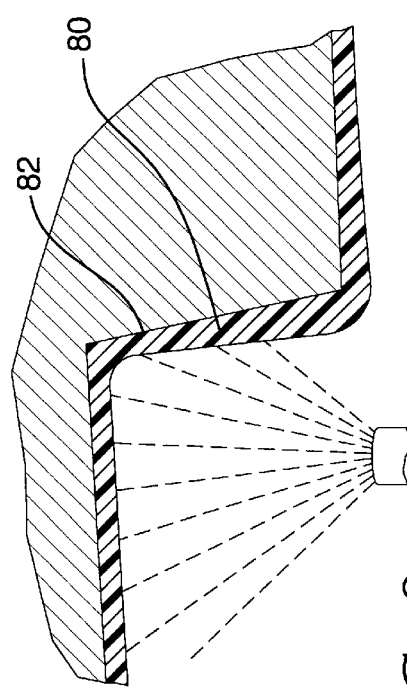
FIG. 8
FIG. 9

METHOD OF MAKING A HIDDEN TEAR SEAM IN A VEHICLE BODY PANEL

TECHNICAL FIELD

The invention relates to a method of making a hidden tear seam in a vehicle body panel to enable deployment of an airbag via tearing of the panel.

BACKGROUND OF THE INVENTION

It is well known in motor vehicles to provide an inflatable air bag which is mounted and concealed behind a vehicle body panel.

The vehicle body panel typically includes a rigid substrate panel, a layer of padding material, and a vinyl skin. The substrate material includes an opening which registers with the air bag. A door panel is hinged within the opening and the vinyl material bridges across the opening and the door panel. The prior art is known to promote tearing of the vinyl upon deployment of the air bag by molding the vinyl to provide a reduced cross section thickness of the vinyl skin at the desired location of the tear seam. It has also been proposed to score the vinyl skin using a laser or other cutting technique to weaken the skin and thereby provide a tear seam.

SUMMARY OF THE INVENTION

The present invention provides a new and improved process for providing a hidden tear seam in a vinyl skin for an air bag mounted on the steering wheel, on the instrument panel, in the door panel, or elsewhere in the vehicle body.

According to the invention, a method of making a thermoplastic skin comprises the steps of providing a mold having a mold surface with first and second mold surface portions which intersect at a sharp corner coincident with the desired location of the tear seam in the molded skin. The mold is oriented with one of the first and second mold surface portions oriented in a generally horizontally orientation and the other of the mold surface portions oriented in a generally vertical orientation. A thermoplastic material such as polyurethane is sprayed onto the mold surface and the curing of the sprayed material is controlled to permit gravity to induce flow of the sprayed material down the vertical surface of the mold at the sharp corner and thereby provide a cured skin which is of significantly lessened thickness at the corner than at other regions of the skin. Accordingly, the reduced thickness of thermoplastic material at the sharp corner defines the tear seam at which the skin material will tear upon deployment of an air bag against the skin.

BRIEF DESCRIPTION OF THE DRAWINGS

These and other objects, features and advantages of the invention will become apparent upon consideration of the description of the preferred embodiment and the appended drawings in which;

FIG. 3 is a section view taken in the direction of arrows 3—3 of FIG. 1;

FIG. 4 is an enlarged view of a portion of FIG. 3;

FIG. 8 is a view similar to FIG. 4 but showing tearing of the vinyl skin upon opening of the door; and FIG. 9 is a view similar to FIG. 7 but showing the mold suspended above the spray head.

DESCRIPTION OF THE PREFERRED EMBODIMENT

Figure 1:
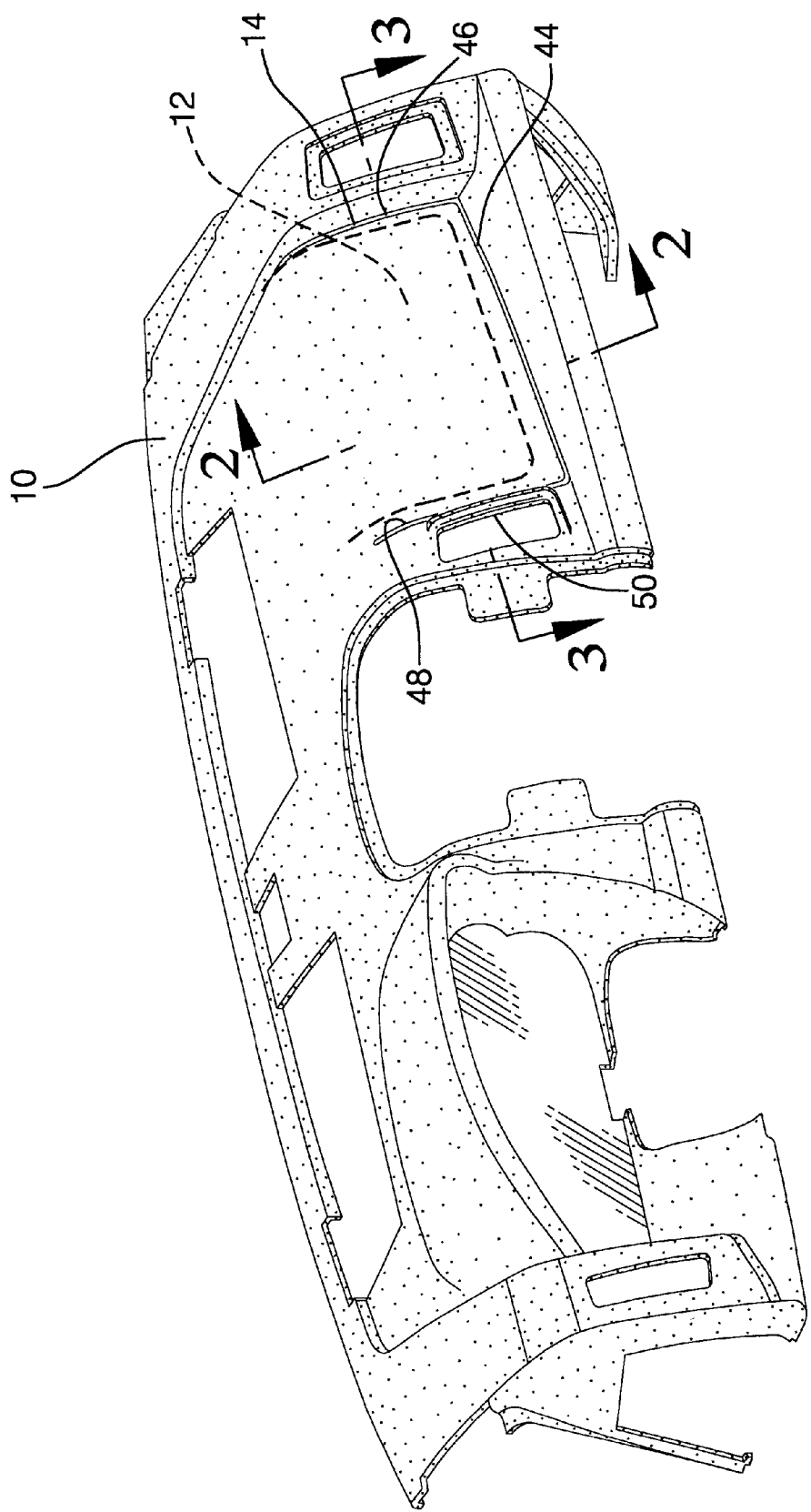
FIG. 1 is an perspective view of a molded vinyl skin for covering a rigid substrate panel and a layer of padding.

Referring to FIG. 1, a motor vehicle instrument panel cover 10 is shown for installation in a motor vehicle body to conceal and enclose such components as the instrument cluster, radio, and heating ventilating and air conditioning systems. The instrument panel cover 10 has a hidden air bag door 12, the edges of the door being generally located behind the indentation 14 in the surface or cover 10.

Figure 2:
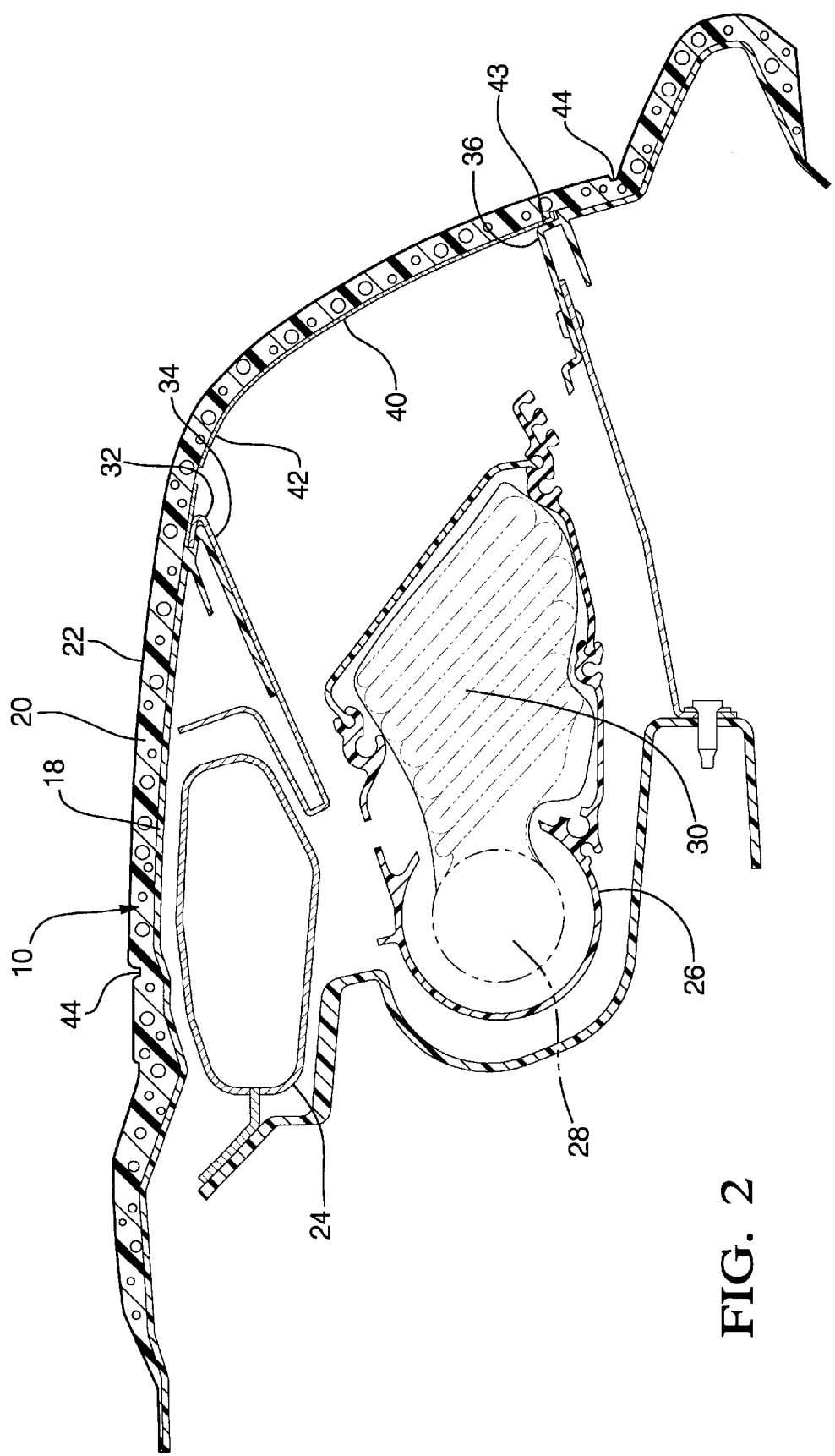
FIG. 2 is a section view taken through a vehicle instrument panel assembly and showing an air bag assembly installed behind an instrument panel cover, which includes a rigid substrate panel, a layer of padding, and the vinyl skin of FIG. 1.

FIG. 2 shows the instrument panel cover 10 of FIG. 1 installed in the vehicle. The instrument panel cover 10 includes a rigid molded plastic substrate 18, a layer of urethane foam 20 and a vinyl skin 22. The instrument panel cover 10 is manufactured by placing the pre-molded substrate 18 and the pre-molded vinyl skin 22 in a mold and then injecting urethane foam into space between the substrate 18 and vinyl skin 22. Alternatively, the skin 22 may be placed on one half of the mold, the substrate 18 placed on the other half of the mold, and then the uncured foam poured into the mold before the mold is closed. Upon curing, the urethane foam 20 adheres to both the substrate 18 and the vinyl skin 22 and provides a layer of cushioning therebetween. As seen in FIG. 2 the instrument panel cover 10 encloses an air conditioning duct 24 and an air bag assembly 26. Air bag assembly 26 includes a conventional inflator 28 and a folded up air bag 30. The substrate 18 of the instrument panel cover has a generally rectangular opening 32 defined in part by a top wall 34 and a bottom wall 36. This opening 32 of the substrate 18 registers with the air bag assembly 26. An air bag door panel 40, of stamped steel or molded plastic construction has a top edge 42 which is suitably hinged to the substrate member 18 adjacent to the top wall 32 of the air bag opening 40 by suitable hinges which are not shown in the drawing. The bottom edge of the door panel seats on a flange 43 of the substrate 18. The layer of urethane foam 20 adheres the vinyl skin 22 to the hinged door panel 40.

Upon actuation of the air bag inflator 28, the air bag 30 is deployed against the backside of the door panel 40, causing the air bag door 40 to hinge upwardly and thereby permit deployment of the air bag into the occupant compartment of the vehicle. It will be understood and appreciated that the upward hinging of the door panel 40 will require tearing of the vinyl skin 22 along the path of the tear seam indentation 14 shown in FIG. 1.

The present invention provides a new and improved method for making a vinyl skin to provide a hidden air bag seam.

Referring to FIG. 2, the lower edge of the hidden tear seam indentation 14 is provided at a shoulder 44 of the vinyl skin 22. Referring to FIG. 3, it is seen that the right hand portion of the hidden tear seam 14 is provided at a shoulder 46 and the left hand portion of the hidden tear seam 14 is provided at a shoulder 48 which melds into the cutout 50 for an air conditioning vent, not shown.

Figure 5:
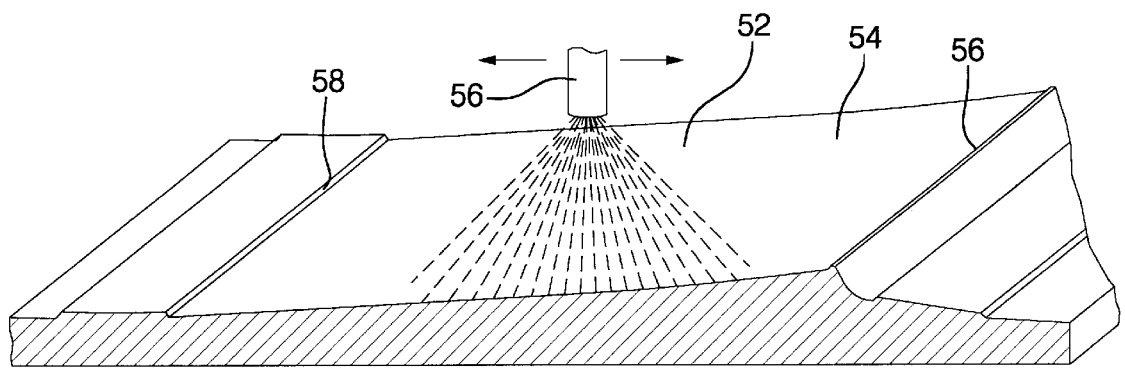
FIG. 5 is a cross section through a mold upon which the vinyl skin is sprayed.

Referring now to FIG. 5, it is seen that a mold 52 is provided for molding the vinyl skin 52 and forming therein the hidden tear seam 14. The mold 52 has a mold surface 54 upon which a spray head 56 will deposit a curable molten thermoplastic material, such as spray urethane. One example of a suitable material spray urethane material is Elastolit® M50555R Resin/Elastolit® M50555ST Isocyanase Spray Aromatic Urethane System by BASF Corporation. The spray gun may be operated by a robot. The mold surface 54 is shaped and suitably grained to provide the outer surface of the vinyl skin 22. The instrument panel designer has intentionally shaped the skin 22 to have mold surface portions which intersect at a sharp corner coincident with the desired location of the tear seam 14 indentation. In particular, the right hand portion 46 of FIG. 3 will be defined by a raised rib structure 56 on the mold, while the left hand portion 48 is defined by a shoulder 58 of the mold.

Figure 6:
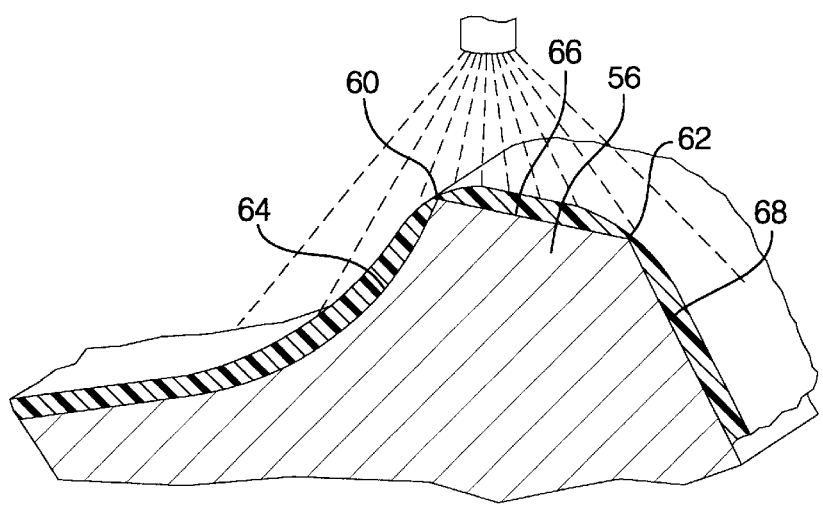
FIG. 6 is an enlarged view of the mold and showing urethane material sprayed upon the mold to make the vinyl skin.

FIG. 6 is an enlarged view of the rib 56 and shows in particular that the rib 56 has a sharp corner 60 and a sharp corner 62. The sharp corner 60 occurs at the intersection of a first mold surface portion 64 which is oriented generally vertically and a second mold surface portion 66 which is oriented generally horizontal. In addition, the sharp corner 62 is defined at the intersection of the second mold surface portion 66 and another mold surface portion 68 which is also oriented generally vertically. FIG. 6 shows the sprayed build up of the urethane material on the mold surface 54. As seen in FIG. 6 the viscosity of the sprayed urethane material enables and causes the sprayed urethane material to slump under the influence of gravity such that the material will flow away from the corners 60 and 62 and down the vertically oriented wall surface portions 64 and 68. Accordingly, while the nominal intended thickness for the vinyl skin may be, for example, 1.0 millimeter, the flow of the liquid material away from the corners will result in a thickness at the corners of 0.2 mm while the thickness further down the vertical wall may build up to perhaps 1.5 mm. It will be understood and appreciated that the extent to which the uncured material will flow and slump, and accordingly the thickness of the vinyl skin 22 at the corners 60 and 62 can be controlled by controlling variables such as sharpness of the corner, the formulation of the plastic material, the viscosity of plastic material, the number of passes made by the sprayer, and/or cure rate of the plastic material, as determined, for example, by heating or cooling of the mold.

Figure 7:
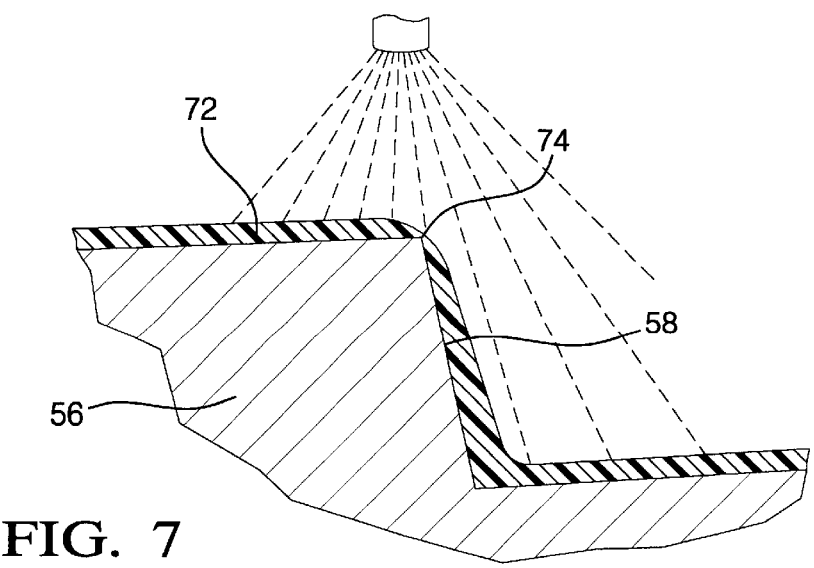
FIG. 7 is an enlarged view of another region of the mold.

Referring to FIG. 7, it is seen that the shoulder 58 of the mold is oriented in the vertical direction and intersects with a horizontal mold surface portion 72 to define a sharp corner 74. The sprayed urethane material flows and slumps to provide a reduced thickness at sharp corner 74 to define the left hand side 48 of the tear seam indentation 14.

After the vinyl is cured, the skin 22 is removed from the mold 54 of FIG. 5 and then subsequently adhered to the substrate 18 by the urethane foam 20 as was previously described herein.

Referring now to FIG. 8, there is shown an enlarged fragmentary view of the right hand portion of the hidden tear seam 46. The air bag is being deployed to forcibly load the air bag door 40 and cause a tearing of the foam 20 and the vinyl skin 22. In particular, FIG. 8 shows the door 40 having begun its opening movement such that the skin 22 has been tensioned and torn at the right hand tear seam 46. It will be understood that this tearing can occur at either the reduced thickness provided at corner 60 of the mold shown in FIG. 6, or at the reduced thickness provided at the corner 62 of the mold. Simultaneously, in a similar fashion, tearing will initiate at the lower portion 44 and left hand portion 48 of the hidden tear seam.

Referring again to FIG. 8, it will be understood that the airbag door 40 is larger than the airbag opening and accordingly overlaps onto the retainer 18 by a distance designated "a". In addition, as seen in FIG. 8, the tear seam is spaced away from the edge of the airbag door 40 by a distance designated "b". These dimensions "a" and "b" may be made greater or lesser to influence the opening performance of the airbag door, for example, to limit and control fragmentation of the foam 20 or skin 22.

It will be understood that tearing of the skin 22 to permit opening of the airbag door 40 is accompanied by tearing of the layer of foam 20. The tearing of the foam 20 at or adjacent to the tear seam of the vinyl skin 22 may be enhanced by surface treatments provided on various regions of the face of the substrate 18. For example, a chemical agent may be provided on surface substrate 80 of the retainer 80 to permit the adjacent region of the foam 20 to easily pull away from the substrate 80. Other surfaces of the substrate 18, such as the surface portion designated at 82, may be molded in a roughened condition, or treated with a suitable chemical binding agent, to enhance adhesion of the foam 20 to the retainer 18 at the surface portion 82

In addition, it may be desirable to enhance the adhesion between the layer of foam 20 and the vinyl skin 22 in the region adjacent to the hidden tear seam. A convenient and no cost method for promoting adhesion between the skin 22 and foam 20 may be obtained by controlling the sprayer 56. In particular, it has been discovered that by first spraying the urethane material onto the mold 54 in the region on the end of the mold adjacent the passenger side airbag, and then proceeding to spray the material at the center of the instrument panel and then the driver side of the instrument panel, the over spray which naturally occurs during the spraying of the material at the center and left hand end of the mold will cause droplets of spray to be deposited on the passenger side end of the skin 22, thereby providing a roughened surface texture of the skin 22 so that when the foam 20 is cured against the skin 22 an enhanced adhesion performance is provided.

Referring to FIG. 9, it is seen that the instrument panel skin may be manufactured by suspending the mold 56 upside down and then spraying the polyurethane material upwardly unto the mold. Accordingly, as seen in FIG. 9, the viscous nature of the uncured material will allow the material to flow and slump so that a thinned cross section is provided at or adjacent corner 82 of the mold. Accordingly, the thin cross section at 80 will provide the hidden tear seam of this invention.

Thus it is seen that the invention provides a new and improved method for making a hidden tear seam in a vehicle body panel.

What is claimed is:

1. Method of making a thermoplastic skin for a vehicle body panel and having a hidden tear seam providing a door through which an air bag may deploy be tearing the skin, comprising the steps of:

designing the skin to have first and second planar skin surfaces which intersect at a sharp corner coincident with the location of the tear seam;

providing a mold having a mold surface with first and second planar mold surface portions which intersect at a corner coincident with the location of the tear seam;

orienting the mold in a stationary position with one of the first and second planar mold surface portions in a generally horizontal orientation and the other of the planar mold surface portions oriented in a generally vertical orientation; and spraying curable thermoplastic material onto both of the planar mold surface portions and controlling the curing of the sprayed material so that the sprayed material deposits in uniform thickness on the generally horizontally oriented one of the mold surfaces and so that gravity will induce flow down the generally vertically oriented surface of the mold at the corner and thereby provide a cured skin material which is of significantly lessened at the corner of the skin than at other regions of the skin whereby an integral hidden tear seam is provided for tearing upon deployment of an air bag against the skin.

2. A method of claim 1 further comprising the thermoplastic skin having a first end region in which the hidden tear seam is provided and another end portion region distant from the portion having a hidden tear seam and in which the curable thermoplastic material is first sprayed upon the region having the hidden tear seam and then subsequently the material is sprayed onto another other region of the mold so that the over spray which occurs when another end portion is sprayed falls upon the first end portion and thereby a roughened surface texture is provided on the first end region.

3. The method of claim 1 further comprising the curable thermoplastic material being sprayed by a spray gun mounted above the mold.

4. The method of claim 1 further comprising the curable thermoplastic material being sprayed by a spray gun mounted beneath the mold and the mold being suspended above the spray gun.

* * * * *